Patented June 4, 1946

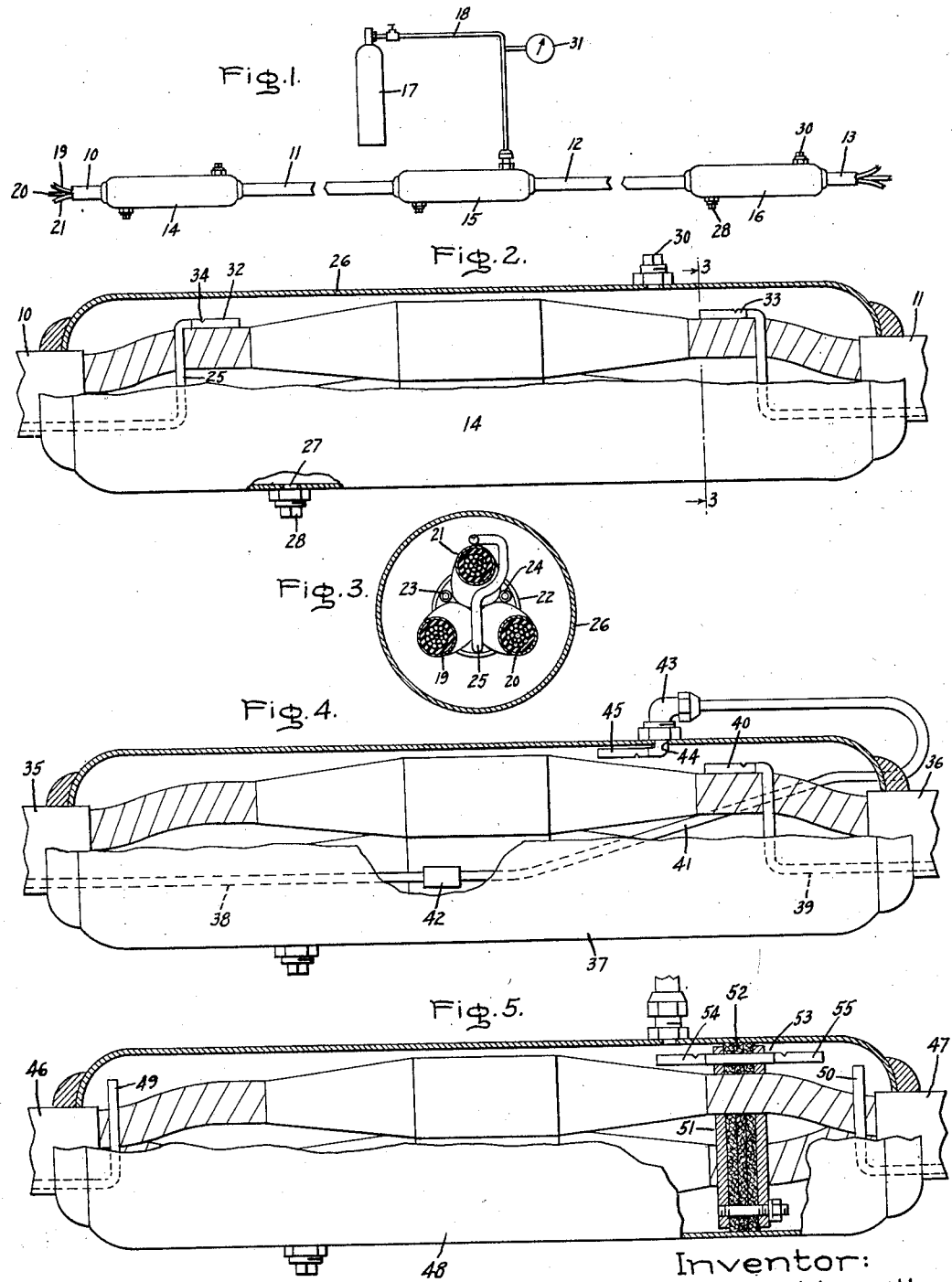
June 4, 1946. L. WETHERILL 2,401,595
GAS-FILLED CABLE SYSTEM
Filed May 7, 1943
Inventor:
Lynn Wetherill,
by Harry E. Dunham
His Attorney.

2,401,595

UNITED STATES PATENT OFFICE 2,401,595

GAS-FILLED CABLE SYSTEM

Lynn Wetherill, Pittsfield, Mass., assignor to General Electric Company, a corporation of New York Application May 7, 1943, Serial No. 486,049

1 Claim. (Cl. 174—11)

The present invention relates to gas-filled cable systems comprising a number of cable sections connected by cable joints together with means for indicating leakage of gas from the system. This leakage-indicating means may be in the simple form of a device indicating the flow of gas at one point of the system or it may be in the form of a plurality of devices each associated with one of the cable joints. Arrangements heretofore used have been either insufficient or complicated and expensive in construction, requiring special connections to be made outside the cable joints.

The object of my invention is to provide an improved construction and arrangement of gas-filled cable systems with leakage-indicating devices which are simple in construction and effective in operation.

For a consideration of what I believe to be novel and my invention, attention is directed to the following description and the claim appended thereto in connection with the accompanying drawing.

In the drawing Fig. 1 illustrates a gas-filled cable system embodying my invention; Fig. 2 is a detail view of a joint of the system of Fig. 1; Fig. 3 is a section along line 3—3 of Fig. 2; and Figs. 4 and 5 are modifications embodying my invention.

The cable system of Fig. 1 comprises a plurality of cable sections 10, 11, 12, 13 connected by joints 14, 15 and 16 respectively. One of the joints, in the present instance the joint 15, is connected to a source of gas under pressure 17 by means of a valved condiut 18. The cable is of the 3-conductor type, each section having three insulated conductors 19, 20, 21 which are spread apart in the joints for splicing with the ends of the adjacent section. The insulated conductors are enclosed by a sheath or cover 22 (Fig. 3) of lead. The wedge-shaped spaces or interstices formed between the three conductors are partly filled by tubing. In the present example I have indicated two open-wall spiral tubings 23, 24 and a solid wall copper tubing 25. In addition to feeding gas to the cable installation the tubings act as a support for the outer lead sheath. The solid wall tubing 25 in addition serves to maintain communication between the different cable sections and thereby to assure the supply of gas under pressure to all of them. The tubings 23, 24, 25 of each section terminate within the cable joints to which the section is connected. In operation, the open wall spiral tubings 23 and 24 may become partially clogged with the insulating compound contained in the cable in those instances in which the cable is installed on ground having hills and valleys. However, in such instances, the solid wall tubing 25 acts to assure a supply of gas under pressure to the different cable sections at all times.

Each cable joint has a casing 26 sealed to the sheath of the cable sections connected thereto and provided with a drain hole 27 closed by a plug 28 and another hole 29 which with regard to joints 14 and 16 is closed by a plug 30. In case one of the sections becomes leaky during operation the gas under pressure will flow towards such section at a rate depending upon the size of the leak. Such leakage ordinarily is indicated by a pressure-responsive device or alarm 31 associated with the valved conduit 18.

According to my invention I provide means enclosed within each cable joint to facilitate the location of gas leaks during operation. These means are in the form of tuned whistles connected with the end of each cable section in a joint adapted to produce audible sounds upon the occurrence of a leak. Preferably each joint includes two whistles of different pitch connected to the ends of the solid copper tubing of the two sections adjacent such joint so that in case of a leak the leaky section can be readily determined.

In the arrangement of Fig. 2 I have shown two whistles or like audible sound-producing means 32 and 33 of different pitch connected to the ends of the solid-wall tubings 25 of the cable sections 10 and 11 respectively. If during operation the whistle 33 is sounded it indicates that gas under pressure flows through the solid-wall tubing 25 of the section 11 into the cable section 10 and that the section 10 or a section beyond the latter in the direction of gas flow is leaking. Vice-versa, if the whistle 32 is sounded it indicates flow of gas from the section 10 toward the cable section 11 and that the leak must be in the section 11 or a section beyond it in the direction of gas flow. Any suitable known type of whistle or sound-producing device may be used. Good results have been obtained with whistles in the form of a tubing open at both ends and provided with a notch-shaped opening 34. One of the open ends is connected to the end of a tubing 25. With such whistles audible sounds can be heard through the cable joint within a range of gas flow which may vary from a rate of about .9 to about 14 cu. ft. per hour. The pitch of each whistle changes in steps as the rate of gas flow varies so that the pitch of the whistle can be interpreted also as an approximate indication of the rate of gas flow.

The arrangement of Fig. 4 comprises two cable sections 35 and 36 connected by a joint 37. Each section includes a solid-wall tubing 38 and 39 respectively. The tubing 39 extends into the joint 37 and at its end is connected to a whistle 40. The tubing 38 extends into the casing of the joint 37 but is brought outside the casing by means of an extension 41 connected to the tubing 38 by a tubing connector 42. The extension 41 has an end portion connected by a knee-connector 43 to an opening 44 in the casing of the joint 37. A whistle 45 is connected to the opening 44 within the casing. During operation gas discharged from the tubing 38 flows through the extension 41 and the whistle 45 into the casing of the joint 37, whence it is conducted through the whistle 40 into the tubing 39. Vice-versa, gas may be discharged from the tubing 39 into the joint, whence it may flow through the whistle 45 and the extension 41 into the tubing 38 of the section 35. The whistles 40, 45 are again both enclosed within the casing of the cable joint and preferably tuned to different pitch. This arrangement differs from that of Fig. 2 in that it facilitates sectionalizing of the cable by disconnecting the knee-connector 43 and plugging the end of the knee-connector 43 as well as the opening 44, thus interrupting or substantially reducing the gas flow between the sections 35 and 36.

In the above examples I have assumed that the cable sections include some open-wall and a solid-wall tubing, and that during operation the gas is primarily conducted from one joint to the succeeding joint through the solid-wall tubing. Some cables do not have any tubing and in other cables which include open and solid-wall tubing a major portion of the gas may be conducted through the open-wall tubing. In such instances it is desirable to use an arrangement as shown in Fig. 5 comprising two cable sections 46 and 47 connected by a joint 48. Each section has a tubing 49 and 50 respectively though such tubing is not essential to the operation of the invention. A semi-stop or barrier 51 is provided within the joint 48. This semi-stop is in the form of a plurality of diaphragms 52 made from suitable gasket material secured together and forming three openings through which the three conductors pass. The semi-stop or barrier forms a fourth opening for accommodating audible sound-producing means, preferably in the form of a double whistle 53 comprising a whistle 54 which upon sounding indicates flow from the cable section 47 to the section 46, and a whistle 55 which upon sounding indicates flow in the opposite direction, that is, from the section 46 to the section 47. During operation substantially all of the gas flow takes place through the whistles 54, 55. If, as in the present example, the cable sections have solid-wall tubings 49, 50 it may be said that the whistle 54 is connected to receive gas discharged from the tubing 50 and the whistle 55 is connected to receive gases discharged from the tubing 49. The communication between the end of tubing 49 and the whistle 55 is established through the portion of the joint to the left of the barrier and the whistle 54.

Having described the method of operation of my invention, together with the apparatus which I now consider to represent the best embodiment thereof, I desire to have it understood that the apparatus shown is only illustrative and that the invention may be carried out by other means.

What I claim as new and desire to secure by Letters Patent of the United States is:

In a gas-filled cable system, the combination of two cable sections, each section comprising an impervious sheath having an insulated conductor and a gas passage therein together with a solid wall tube for conveying gas through the section, means for supplying gas under pressure to one of the sections, a joint for connecting the cable sections, the solid wall tubing of each section being connected to the interior of the joint and whistles of different pitch associated with the ends of the tubings within the joint and being operable by a flow of gas through the solid wall tubings in one section to give an indication of a gas leak through the sheath in the other section, the pitch of the sound determining in which section the leak occurs.

LYNN WETHERILL.